United States Patent [19]

McKee

[11] Patent Number: 4,567,688

[45] Date of Patent: Feb. 4, 1986

[54] PNEUMATICALLY ACTUATED ANIMAL TRAP

[76] Inventor: James E. McKee, 4336 Overhill Dr., Dallas, Tex. 75205

[21] Appl. No.: 652,310

[22] Filed: Sep. 19, 1984

[51] Int. Cl.[4] ........................................... A01M 23/18
[52] U.S. Cl. ..................................................... 43/61
[58] Field of Search ........................ 43/61, 58, 60, 74

[56] References Cited

U.S. PATENT DOCUMENTS

| | | | |
|---|---|---|---|
| 1,650,455 | 11/1927 | Lewis | 43/61 |
| 3,483,652 | 11/1969 | Hanlan | 43/61 |
| 3,913,258 | 10/1975 | Souza | 43/61 |
| 4,080,749 | 3/1978 | Gilbaugh | 43/61 |
| 4,162,588 | 7/1979 | Wyant | 43/61 |
| 4,342,172 | 8/1982 | Guanci | 43/61 |

*Primary Examiner*—Gene P. Crosby
*Attorney, Agent, or Firm*—Hubbard, Thurman, Turner & Tucker

[57] ABSTRACT

A pneumatically actuated animal trap comprising a trap cage having a movable closure wall which is secured in an open position by a latch mechanism connected to an actuating rod which is connected to a piston and cylinder type pneumatic actuator. The pneumatic actuator is in communication with a pressure air filled storage vessel supported on the trap cage and connected to a pilot operated control valve which is actuated to valve pressure fluid to the pneumatic actuator in response to engagement of a triggering mechanism by an animal to be captured in the trap. The storage vessel and control circuit are self contained and adapted for remote, long term unattended operation.

11 Claims, 6 Drawing Figures

PNEUMATICALLY ACTUATED ANIMAL TRAP

BACKGROUND OF THE INVENTION

1. Field of the Invention

The present invention pertains to a pneumatically actuated animal trap particularly adapted for capturing animals alive.

2. Background

In the art of animal traps there has been a need to develop a trap which has a triggering mechanism which is reliable and difficult for an animal to circumvent. In particular, the trapping of fur bearing mammals and certain kinds of varmints has been become difficult as many animals have become accustomed to prior art types of traps and avoid the trap triggering or release mechanism. Moreover, prior art efforts to develop mechanical triggering mechanisms which are suitably sensitive to be actuated by the animal to be trapped have been unsuccessful since the more sensitive triggering mechanisms are susceptible to environmental effects such as wind and precepitation wherein the mechanism is prematurely released and the trap rendered inoperative.

Accordingly, there has been a need to develop a trap triggering and actuating system which is reliable, is not susceptible to premature actuation and is not easily avoided by wary or "trap shy" animals. In particular, there has been a need for the development of a suitable triggering and actuating mechanism for traps which are intended to capture animals live and uninjured. In this regard consideration has been given to the adaptation of motor operated traps operating from either an electrical or pressure fluid source. The development of pressure fluid operated traps has been hampered by the failure to be able to provide a remote source of pressure fluid such as a storage vessel or accumulator and control circuitry including valve mechanisms which are substantially leakproof and do not permit unwanted leakage of pressure fluid from the storage vessel during the time that the trap is unattended. However, the problems of providing suitable release and actuating mechanisms for traps and the provision of a suitable pressure fluid actuated trap has been overcome with the present invention.

SUMMARY OF THE INVENTION

The present invention provides an animal trap having trap closure means which is actuated by a pneumatic actuating system including improved control valving therefor.

In accordance with one aspect of the present invention there is provided an animal trap having a trap closure mechanism which is actuated by a pneumatic actuator to release a trap door to trap live animals and which is connected to a source of pressure air through a control circuit having a virtually leak proof control valve and a triggering mechanism which is not susceptible to unwanted actuation.

In accordance with another aspect of the present invention there is provided a pneumatically actuated animal trap having a storage vessel for containing a quantity of compressed gas which may be easily recharged and which is constructed integral with a unique control valve comprising part of a control circuit for actuating the trap to capture an animal which has triggered the control circuit to release a charge of pressure air to a pneumatic actuator.

In accordance with yet a further aspect of the present invention a pneumatic actuator system is provided for converting mechanically actuated live animal traps to pneumatically actuated traps wherein existing traps may be retrofitted and new traps may be manufactured easily for use with either mechanical or pneumatic actuating mechanisms.

Those skilled in the art will recognize the above mentioned features and advantages of the present invention as well as additional superior aspects thereof upon reading the detailed description which follows in conjunction with the drawing.

DESCRIPTION OF THE PREFERRED EMBODIMENT

Figure 1:
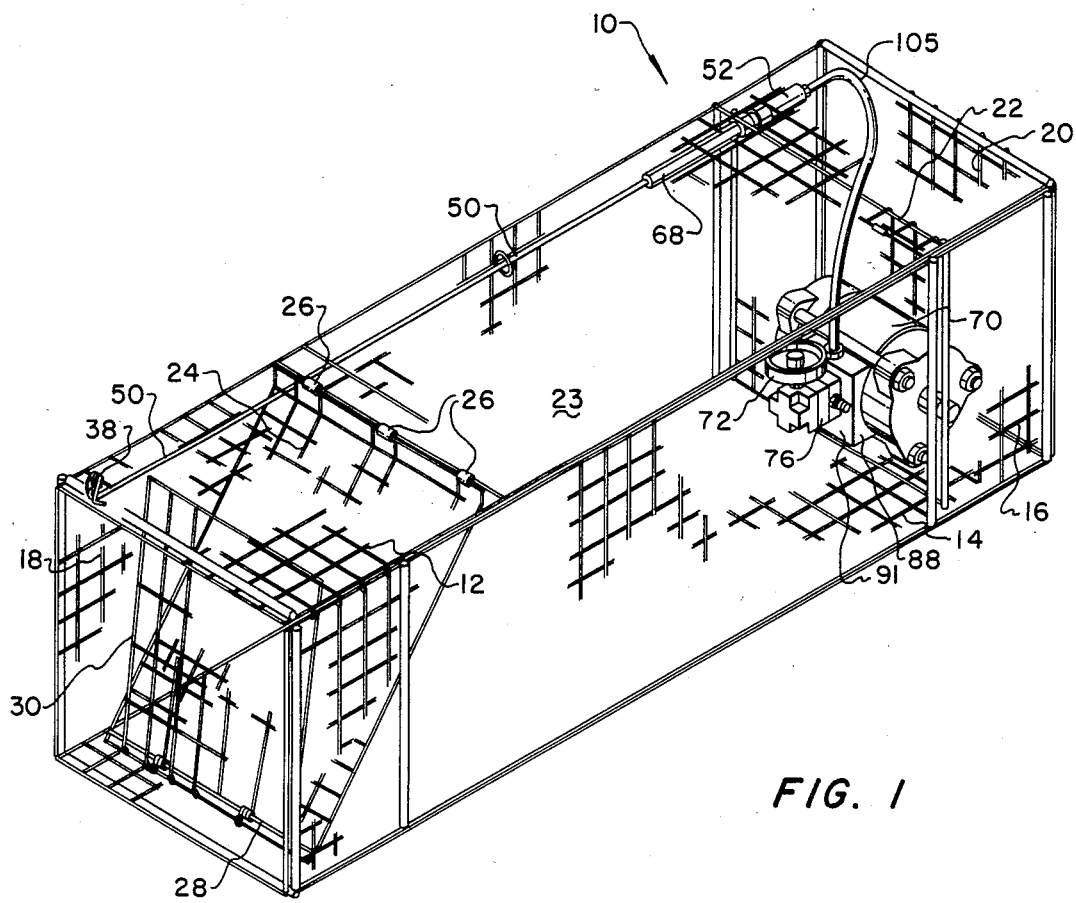
FIG. 1 is a perspective view of a pneumatically actuated animal trap in accordance with the present invention.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity and consciseness.

Referring to FIG. 1 there is illustrated an animal trap, generally designated by the numeral 10, particularly adapted for trapping live animals such as small fur bearing mammals, varmints or domestic animals. The trap 10 is of a substantially rigid wire mesh construction having cage means formed by a crossed wire mesh top wall 12, bottom wall 14, opposed side walls 16 and 18, an outer end wall 20 and an intermediate or inner end wall 22. The walls 12, 14, 16, 18, 20 and 22 are suitably secured to each other and detailed description of the basic trap structure is not believed to be necessary to a complete understanding of the present invention. The trap 10 may, for example, be of a type manufactured by Tomahawk Live Trap Company, Tomahawk, Wisconsin.

Figure 2:
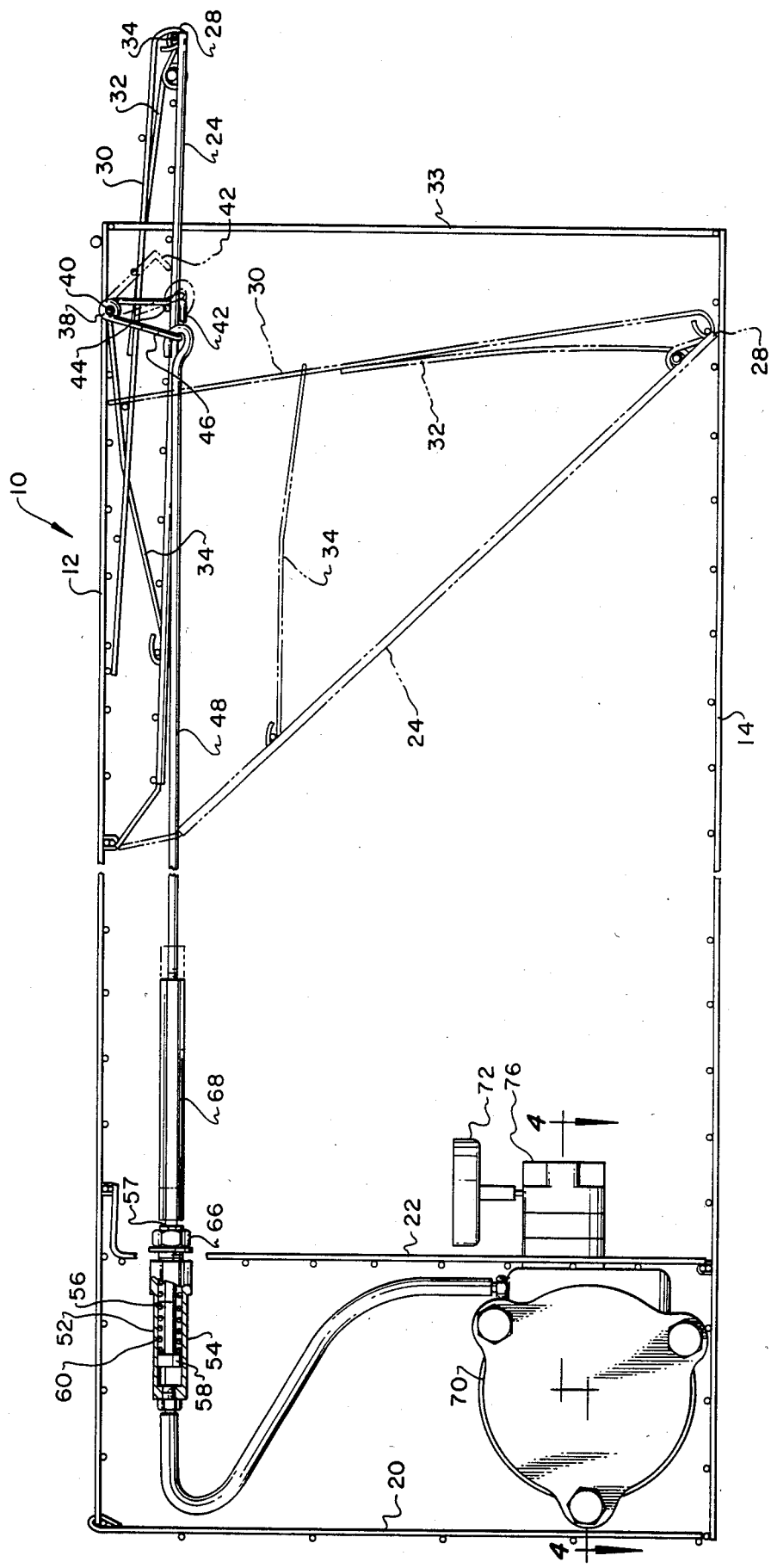
FIG. 2 is a detail elevation view of the actuating mechanism and the trap closure door of the trap illustrated in FIG. 1.

The trap 10 is of a type which has a closure mechanism for closing the end of the trap opposite the inner end wall 22 for trapping an animal within the interior 23 of the trap without injuring the animal so that the animal may be later transferred to another enclosure or suitably disposed of. Referring also to FIG. 2 the closure for the trap 10 comprises a wire mesh wall 24 which is hinged to the top wall 12 by hinges 26, FIG. 1, and operable to move from a retracted position lying generally flush and adjacent to the top wall 12 to a closed position wherein the bottom transverse edge 28 of the wall 24 forcibly engages the bottom wall 14. The closure door or wall 24 is retained in the closed position by a spring biased wall member 30 which is hinged to the bottom edge 28 of the wall 24 for rotation relative to the wall 24 to a substantially vertical position in forcible engagement with the top wall 12 when the wall 24 moves to the closed position. In this way the wall 24 is locked in the closed position to prevent unwanted exit from the trap by an animal in the interior 23. Torsion coil springs 32, FIG. 2, one shown, are secured to a bar 34 forming a part of the bottom edge 28 of the closure wall 24 and bias the member 30 to rotate relative to the closure wall 24 to the substantially vertical position shown by the alternate position lines in FIG. 2 when the wall 24 is released to drop into a closed position. A restraining member 34 limits rotation of the member 30 to the substantially vertical position illustrated to prevent upward movement of the wall 24 unless the member 30 is intentionally rotated against the bias of the springs 32 to lie adjacent to the wall 24.

FIG. 2 illustrates the retracted position of the wall 24 and the member 30 generally adjacent to and directly below the top wall 12 so that a substantial unobstructed opening 33 is provided at one of the trap for entry of the animal to be captured. The closure wall 24 is retained in the open position by actuating linkage comprising a bellcrank member 38 rotatably mounted on the top wall 12 for pivotal movement about a member 40 comprising part of the top wall structure. The bellcrank 38 has a latch formed by a hook portion 42 depending into a position wherein it may engage a wire member 44 forming part of the wire mesh structure of the closure wall 24. The bellcrank 38 also includes a crank arm 46 which is connected an elongated actuating rod 48 extending toward the inner end wall 22. The rod 48 is journalled by bearing means 50, FIG. 1, secured to the top wall 12.

Looking further at FIG. 2 the improved pneumatically actuated trap 10 includes an actuator 52 comprising a single acting spring return cylinder and piston assembly comprising a cylinder member 54, an axially extensible piston rod 56 extending from one end of the cylinder and secured to a piston 58. A biasing spring 60 is disposed in the cylinder 54 and biases the piston 58 and the rod 56 to the left, viewing FIG. 2, to tend to rotate the bellcrank 38 in a clockwise direction, thereby retaining the hook 42 securely engaged with the closure wall 24. The actuator 52 includes a threaded extension 57 of the cylinder 54 extending through the inner wall 22 and secured thereto by a nut 66. The distal end of the piston rod 56 is threadedly connected to a turnbuckle member 68 also connected to the actuating rod 48 for adjustably positioning the end of the piston rod 56 with respect to the bellcrank 38. In response to introduction of pressure air into the cylinder 54 the rod 56 is extended to the right, viewing FIG. 2, to rotate the bellcrank 38 in a counter clockwise direction to release the closure wall 24 for pivotal movement to the closed position.

Figure 3:
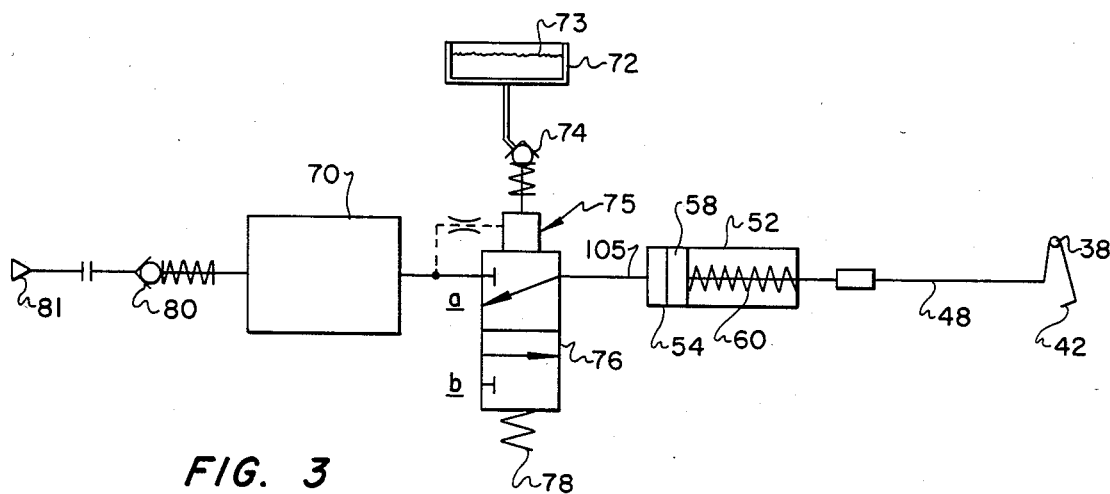
FIG. 3 is a schematic diagram of the trap control system.

Referring now to FIG. 3, there is illustrated a schematic diagram of a control circuit for operating the actuator 52 to move the rod 48 as aforedescribed. The apparatus 10 includes a pressure vessel 70 for storing a charge of pressure air therein for operating the actuator 52 in response to engagement of a trigger member 72, indicated schematically in FIG. 3, and illustrated in FIG. 2 as comprising a generally cupped shaped member which is disposed within the trap interior 23 and adjacent the inner end wall 22. The trigger cup 72 may be filled with a suitable attractant or bait 73 to cause the animal to be captured to venture into the interior 23 of the trap. The trigger member 72 is connected to a pressure relief valve 74 comprising a spring biased check valve which is responsive to movement of the trigger member 72 to valve pressure fluid to atmosphere from the pilot actuator 75 of a zero leakage control valve generally designated by the numeral 76.

The valve 76 is illustrated as a NOT type valve which is internally pilot actuated to be in a position to block the flow of pressure air from the pressure vessel 70 to the actuator 52 and to vent the cylinder of the actuator 52 so that the spring 60 is operable to return the piston 58 to a position holding the bell crank 38 in a locking position. In response to venting pressure air from the pilot actuator 75 of the valve 76 a biasing spring 78 is operable to move the valve from its position a illustrated to the position b to conduct pressure air to the actuator 52. Once the closure wall 24 has been released to close it is inconsequential whether or not the control circuit resets itself by closure of the valve 74. However, upon closure of the valve 74 a residual pressure air charge in the pressure vessel 70 is operable to reset the valve 76 to its position a to vent the cylinder 54 of the actuator 52. The pressure vessel 70 is preferably filled with a predetermined quantity of pressure air at a sufficient pressure to maintain a suitable charge over an extended period of time. A suitable spring biased check valve 80 is in communication with the pressure vessel 70 and is operable to be placed in communication with a source of pressure air for charging the pressure vessel 70. With a control system of the type illustrated in FIG. 3 a trap such as the trap 10 may be set in a remote area and periodically charged with a fresh charge of pressure air after usage by the trapper who may carry a portable pressurized tank 81 filled with pressure air of a sufficient amount to recharge one or more traps 10 having a control system in accordance with the foregoing description.

Figure 4:
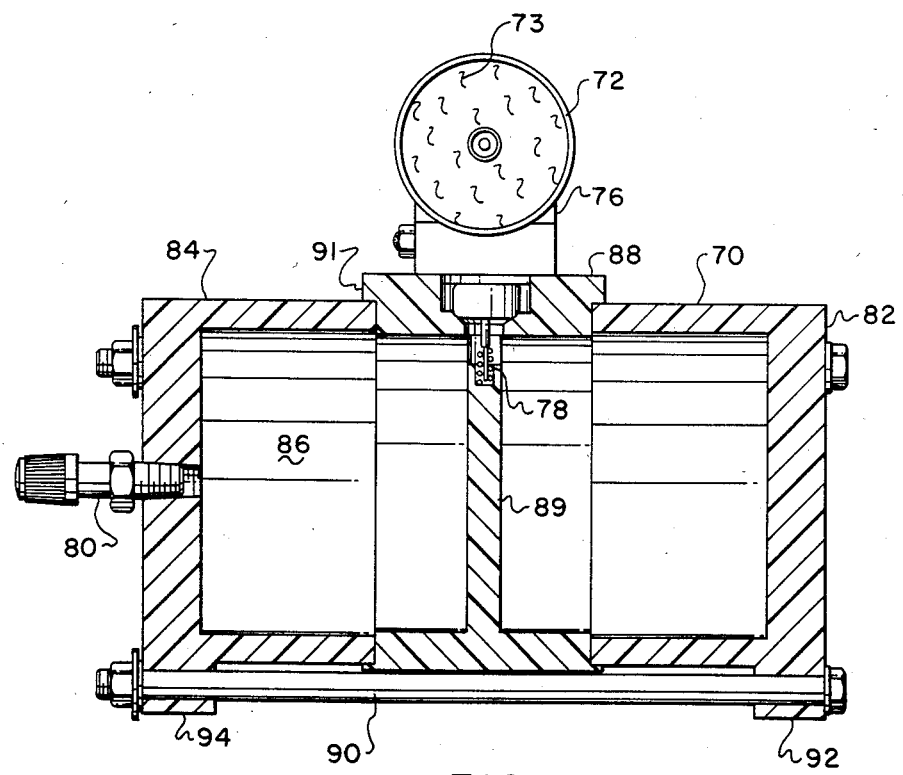
FIG. 4 is a section view taken along the line 4—4 of FIG. 2 showing the structural features of the storage vessel.

Referring to FIGS. 4, in a preferred embodiment of a control system for operating the trap 10, the pressure vessel 70 is made up of opposed head members 82 and 84, the latter being adapted to support the check valve 80 in communication with an interior chamber 86. A center body portion 88 is interposed between the head members 82 and 84 and the pressure vessel 70 and is held in assembly by a plurality of tie rods 90 comprising conventional hexagonal bolt and nut assemblies which extend through and are secured to opposed flanges 92 and 94 formed on the respective head members 82 and 84. The body member 88 includes a central transverse partition 89 which, as shown, serves as a support member for the actuating spring 78 of the control valve 76.

Figure 6:
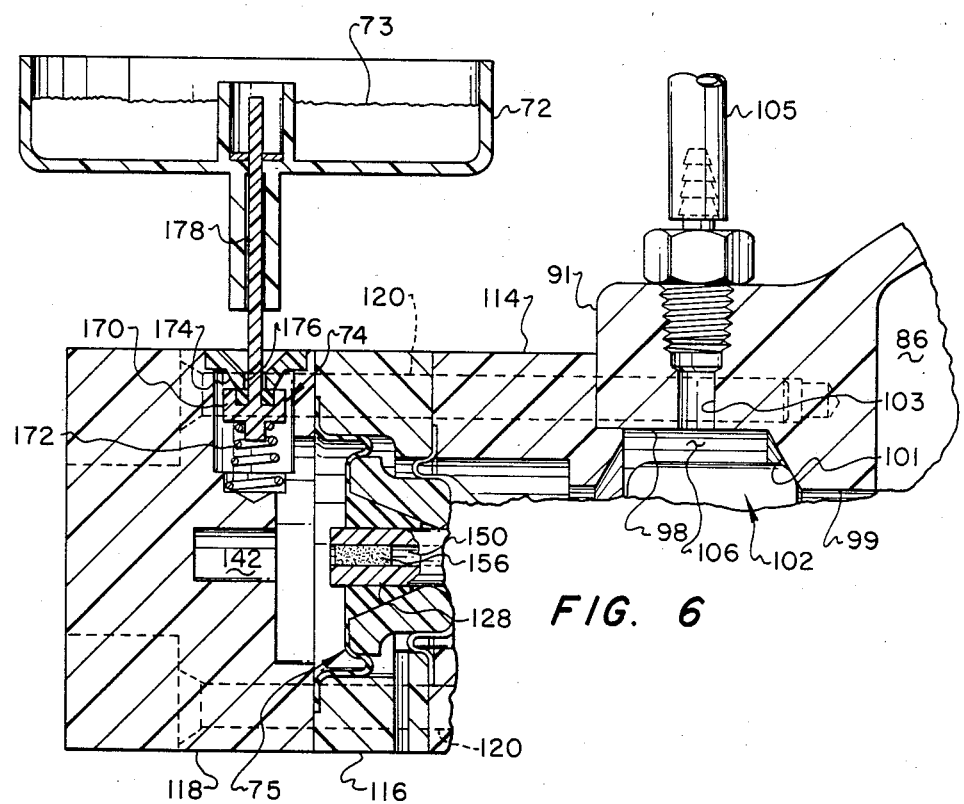
FIG. 6 is a detail section view of the triggering mechanism and pilot pressure relief valve.
Figure 5:
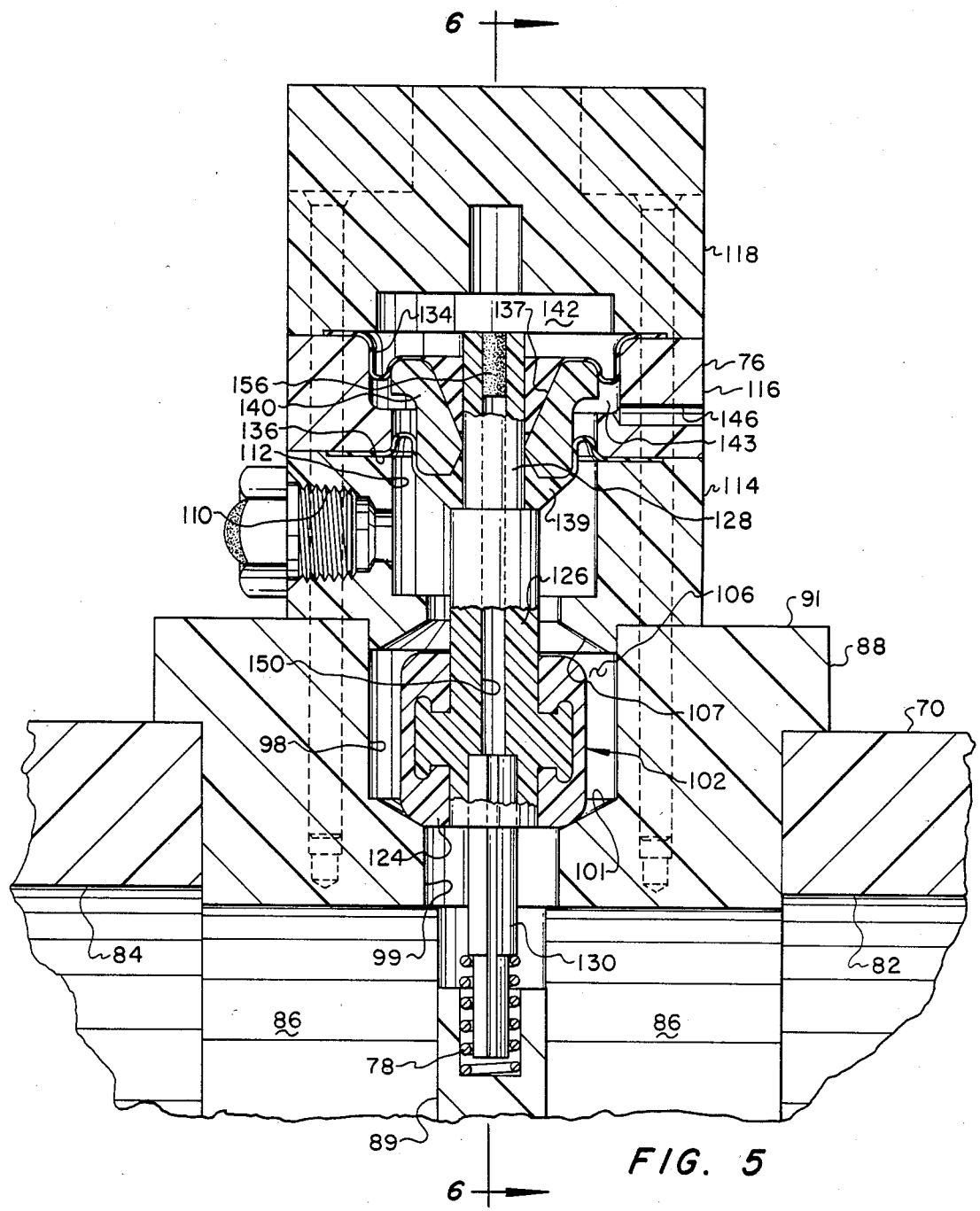
FIG. 5 is a detail section view of the control valve taken along the same line as FIG. 4.

Referring to FIGS. 5 and 6, the valve 76 is of a type which is particularly operable to be essentially a zero leakage type valve in the closed position to prevent unwanted depletion of the charge of pressure air in the vessel 70. The valve 76 is of construction similar to the control valve disclosed in my co-pending U.S. patent application Ser. No. 574,278 filed Jan. 26, 1984. In the embodiment of the apparatus and control circuit of the present invention the pressure vessel center body 88 includes a laterally projecting boss 91 forming a portion of the valve body structure and including a stepped bore 98, 99 forming therebetween a frustoconical seat surface 101. The bore portion 99 opens into the chamber 86 on both sides of the center partition 89 to provide a substantially unobstructed flow path for pressure air to flow from the chamber 86 into the bore 98 in response to movement of a valve closure member 102 from a position of engagement of the seat 101 to a position away from the seat 101 to allow pressure air to flow through a discharge passage 103 and through a conduit 105 to the actuator 52.

In the position of the valve closure member 102 illustrated in FIGS. 5 and 6, the chamber 106 is in communication with atmosphere through a vent port 110, FIG. 5, and a bore 112 formed in a valve body member 114 secured to the boss 91. The valve body member 114 is interposed between the boss 91 and a second valve body member 116 and a valve cover member 118. The members 114, 116 and 118 are secured in assembly with the boss 91 by conventional threaded fasteners 120.

Referring further to FIG. 5, the closure member 102 includes a generally cylindrical resilient seal forming plug 124 molded integral with a core member 126, a shaft portion 128 and a second shaft portion 130. The pilot actuator 75 is characterized by a pair of opposed flexible rolling diaphragm members 134 and 136, secured on shaft portion 128. The diaphragm members 134 and 136 are both integrally formed of a suitable elastomeric material such as molded neoprene or polyurethane and are fitted over the shaft portion 128 in the manner illustrated by wedging engagement of respective hub portions 137 and 139 into opposed conical bores formed in a support member 140. The diaphragms 134 and 136 are suitably clamped about their respective peripheral edges between opposed faces of the body part 116 and the respective body parts 114 and 118. The effective axial projected face area of the diaphragm 134 is greater than that of the diaphragm 136 when assembled in the valve 76, as illustrated, whereby the closure member 102 will be shifted into fluid-tight engagement with the seat 101 in response to the introduction of pressure fluid into cavity 142. A chamber 143 is formed in body part 116 between the diaphragms 134 and 136 and is vented through a passage 146.

Pressure fluid is communicated to the cavity 142 through a passage 150 opening to the distal end of the shaft portion 128. A sintered metal flow restrictor plug 156 is interposed in the passage 150 at the distal end of the shaft portion 128. As shown in FIG. 6, the pressure relief valve 74 includes a closure member 170 which is biased by a spring 172 into engagement with a seat 174 having a central passage 176 formed therein. The closure member 170 includes an elongated stem portion 178 on which the trigger member 72 is suitably mounted. The closure 170 is normally biased in a closed position by the spring 172 to prevent the relief of fluid pressure in the cavity 142 through passage 176 to atmosphere. However, in response to relatively slight engagement of the trigger cup 72 the closure member 170 is moved away from the seat 174 to allow pressure fluid to flow out of the cavity 142 faster than it may be replenished through the passage 150 and the flow restrictor plug 156.

In response to actuation of the pilot pressure relief valve 74, FIG. 6, to vent pressure fluid from the cavity 142, the closure member 102 will shift from the position shown into engagement with the valve seat 107 blocking communication of pressure fluid between the passages 103 and 110.

From the foregoing it will be appreciated that the valve 76 is of unique construction and is particularly adapted for applications wherein substantially zero leakage of pressure gas from the reservoir chamber is permitted over an extended period of time. This type of valve is particularly useful in applications such as a remote installation of the trap 10 wherein a predetermined charge of pressure air is introduced into the chamber 86 and must not be allowed to leak out of the chamber over an extended period of time prior to actuation of the trap to capture an animal venturing thereinto.

The operation of the trap 10 is believed to readily understandable from the foregoing description. If an animal should venture into the interior 23 of the trap when the closure wall 24 is retracted and engage the trigger cup 72 the valve 74 will operate to rapidly relieve pressure air in the chamber of the pilot actuator 77 to cause the closure member 102 to shift from engagement with the seat surface 101 to engagement with the seat surface 107 under the urging of the spring 78 to rapidly valve pressure fluid to the actuator 52 energizing same to release the closure wall 24 to drop to the closed position. Once the valve 74 has been disengaged the pilot actuator 75 will reset the closure member 102 into engagement with the seat 101 thereby venting pressure fluid from the actuator 52 through the passages 103, bore 112 and exhaust port 110. If a residual charge of pressure fluid remains in the chamber 86 the trap is ready for another operating cycle once the closure wall 24 has been reset to the open position secured by the bellcrank 38.

Although a perferred embodiment of the present invention has been described in detail herein those skilled in the art will recognize that various substitutions and modifications may be made to the specific structure described without departing from the scope and spirit of the invention as recited in the appended claims.

What I claim is:

1. In an animal trap for placement in remote unattended locations for capturing relatively small animals live, cage means forming an enclosure for trapping said animals including rear wall means and a closure spaced from said rear wall means and operably connected to said cage means for closing said cage means upon entry of said animal into said cage means, actuating means for effecting operation of said closure upon entry of an animal into said cage means, said actuating means including a pressure fluid reservoir, a pressure fluid actuator operably connected to said closure, and control means for valving pressure fluid to said actuator and including trigger means engageable by an animal in said cage means for effecting operation of said control means to effect movement of said closure to close said cage means.

2. The animal trap set forth in claim 1 wherein:
said closure comprises a wall hinged to said cage means, and said actuator is operable to effect movement of said wall to close an opening in said cage means in response to energization of said actuator.

3. The animal trap set forth in claim 2 wherein:
said wall includes spring means for biasing said wall toward a closed position over said opening and said actuator includes latch means for holding said wall in an open position against the urging of said spring means.

4. The animal trap set forth in claim 2 wherein:
said trigger means includes a member connected to an attractant, said attractant being disposed adjacent said rear wall of said cage means.

5. The animal trap set forth in claim 2 wherein:
said reservoir means comprises a pressure vessel having a chamber formed therein for storing a charge of pressure gas, and said control means includes pilot pressure gas operated valve means for conducting pressure gas to said actuator in response to actuation of said trigger means.

6. The animal trap set forth in claim 5 wherein: said trigger means includes a pilot pressure fluid relief valve for releasing pressure gas from said gas operated valve means to effect movement of said gas operated valve means.

7. The animal trap set forth in claim 5 wherein: said gas operated valve means includes housing means formed in part by said pressure vessel to minimize pressure gas conduit means interconnecting said vessel and said gas operated valve means.

8. In an animal trap for capturing fur bearing animals, varmints and like creatures in remote unattended trap sites, cage means formed by a generally rectangular elongated formed wire box having a rear wall and an intermediate wall spaced from said rear wall, an opening at the end of said cage means opposite said intermediate wall, a movable closure wall of said cage means for closing said opening, said closure wall being hinged to said cage means and operably connected to spring means for urging said closure wall to close said opening to trap an animal in said cage means, and latch means for holding said closure wall in an open position against the bias of said spring means, said latch means being connected to an elongated actuating rod extending toward said intermediate wall; the improvement comprising:

a pneumatic actuator connected to said actuating rod for effecting movement of said latch means;

a pressure vessel forming a chamber for storing a charge of pressure gas, said pressure vessel being disposed on said animal trap between said rear wall and said intermediate wall, a pilot pressure gas operated valve disposed at said intermediate wall and including trigger means for effecting operation of said valve to conduct a charge of pressure gas from said chamber to said actuator, said trigger means including an animal attractant disposed adjacent said intermediate wall for luring an animal totally into said cage means and toward said intermediate wall.

9. The animal trap set forth in claim 8 wherein: said pressure vessel includes a section having a bore formed therein, said section forming part of a valve body for said pilot operated valve, said bore opening into said chamber, a valve seat formed in said section, and a valve closure member including resilient seal means thereon and engageable with said seat to prevent leakage of pressure gas from said chamber.

10. The animal trap set forth in claim 9 wherein: said valve includes pilot pressure gas operated piston means for urging said closure member toward a closed position in engagement with said seat and said trigger means includes a pilot pressure gas relief valve, an attractant member connected to said relief valve, spring means for urging said relief valve to a closed position and responsive to momentary engagement of said attractant member to release pressure gas to allow said closure member to move to a position to valve a quantity of pressure gas to said actuator.

11. The animal trap set forth in claim 8 wherein: said actuating rod extends along and within said cage means toward said intermediate wall and is connected at one end to said pneumatic actuator and at its opposite end to a bellcrank comprising said latch means.

* * * * *